United States Patent [19]
Bornhors, Jr. et al.

[11] Patent Number: 5,492,057
[45] Date of Patent: Feb. 20, 1996

[54] METHOD AND APPARATUS FOR POSITIONING AT LEAST ONE ENGRAVING HEAD

[75] Inventors: Kenneth F. Bornhors, Jr., Centerville; Kim E. Izor, Miamisburg; David R. Seitz, Vandalia, all of Ohio

[73] Assignee: Ohio Electronic Engravers, Inc., Dayton, Ohio

[21] Appl. No.: 242,012

[22] Filed: May 12, 1994

[51] Int. Cl.$^6$ .................................................. B31F 1/07
[52] U.S. Cl. .................... 101/32; 101/485; 101/401.1; 409/108; 409/109; 358/299
[58] Field of Search ........................... 101/32, 483, 485, 101/401.1; 358/477, 478, 297, 299, 456, 458; 219/121.6, 121.61, 121.62; 318/569; 409/108, 109

[56] References Cited

U.S. PATENT DOCUMENTS

| | | | |
|---|---|---|---|
| 3,280,252 | 10/1966 | Lilien et al. | 358/450 |
| 3,770,888 | 11/1973 | Allard de Vos et al. | 358/299 |
| 3,784,739 | 1/1974 | Allard de Vos et al. | 358/477 |
| 3,937,873 | 2/1976 | Gastineau | 358/297 |
| 4,007,362 | 2/1977 | Sindermann | 358/487 |
| 4,079,235 | 3/1978 | Froyd et al. | 364/107 |
| 4,126,821 | 11/1978 | Cannon | 318/696 |
| 4,342,052 | 7/1982 | Rackley et al. | 358/450 |
| 4,347,785 | 9/1982 | Chase | 101/401.1 |
| 4,357,633 | 11/1982 | Buechler | 101/32 |
| 4,450,486 | 5/1984 | Buechler | 101/491 |
| 4,603,391 | 7/1986 | Inoue et al. | 364/474 |
| 4,678,976 | 7/1987 | Inoue | 318/577 |
| 4,683,500 | 7/1987 | Kitamura et al. | 358/280 |
| 5,329,215 | 7/1994 | Fraser et al. | 318/569 |
| 5,424,845 | 6/1995 | Holowko et al. | 358/299 |
| 5,438,422 | 8/1995 | Holowko et al. | 358/299 |
| 5,440,398 | 8/1995 | Holowko et al. | 358/299 |

OTHER PUBLICATIONS

"Helio Klischograph K301 and K302 for Magazine Gravure Printing," Hell Graphic Systems, Inc., Dr. Ing. Rudolf Hell GmbH, P.O. Box 6229, D– 2300 Kiel 14, undated brochure.
"HelioKlischograph K304 for Packaging and Product Gravure Printing," Hell Graphic Systems, Inc., Dr., Ing. Rudolf Hell GmbH, P.O. Box 6229, D– 2300 Kiel 14, undated brochure.
"Helio–Klischograph—Precision Engraving in Copper," Hell Graphic Systems, Inc., Dr. Ing. Rudolf Hell GmbH, P.O. Box 6229, D–2300 Kiel 14, undated brochure.
JAV, "Getting Better Accuracy with Non–Precision Ball Screws", American Machinist, Feb. 1993, pp. 50–51.
Datwyler, "Polishmaster Junior High–Precision Machining and Measuring Center for Rotogravure Cylinders" (undated).

(List continued on next page.)

Primary Examiner—Eugene H. Eickholt
Attorney, Agent, or Firm—Jacox, Meckstroth & Jenkins

[57] ABSTRACT

A system for locating a plurality of engraving heads on an engraver wherein a plurality of engraving heads are automatically positioned into a predetermined configuration. A mechanism for positioning the engraving heads preferably includes a leadscrew and a drive nut which is rotatable relative to the leadscrew. In addition, each of the engraving heads preferably includes a rotatable drive nut with a respective motor for rotating the nut whereby the heads may be selectively positioned into a predetermined configuration. In a further aspect of the invention, the engraving heads are mounted on a carriage which is movable in an axial direction relative to a cylinder to be engraved. The heads are selectively positionable on the carriage and the carriage includes a nut threadably engaged with a leadscrew whereby the carriage may be driven in an axial direction relative to the cylinder to be engraved. In yet another aspect of the invention, a method is provided for engraving a cylinder including mounting a cylinder in the engraver, automatically adjusting a plurality of engraving heads into a predetermined configuration, and engraving a plurality of images onto the cylinder.

94 Claims, 7 Drawing Sheets

OTHER PUBLICATIONS

Datwyler, "Polishmaster High Precision Machining and Measuring Centre for Gravure Cylinders" (undated).

Datwyler, "Finishmaster Unit for polishing of rotogravure cylinders after copper or chrome plating" (undated).

Datwyler, "Cu—Mater Type E Plating Tanks for cooper-plating of rotogravure cylinders" (undated).

Datwyler, "Cr—Master Type E Plating Tanks for the chrome-plating of rotogravure cylinders" (undated).

Kaspar Walter, "Twin-Pilot Copper Polishing Machine with 2 Polishing Heads" (undated).

"Datwyler," MDC Max Daetwyler Corp., USA, 13420 West Reese Blvd., Huntersville, North Carolina 28078, updated brochure.

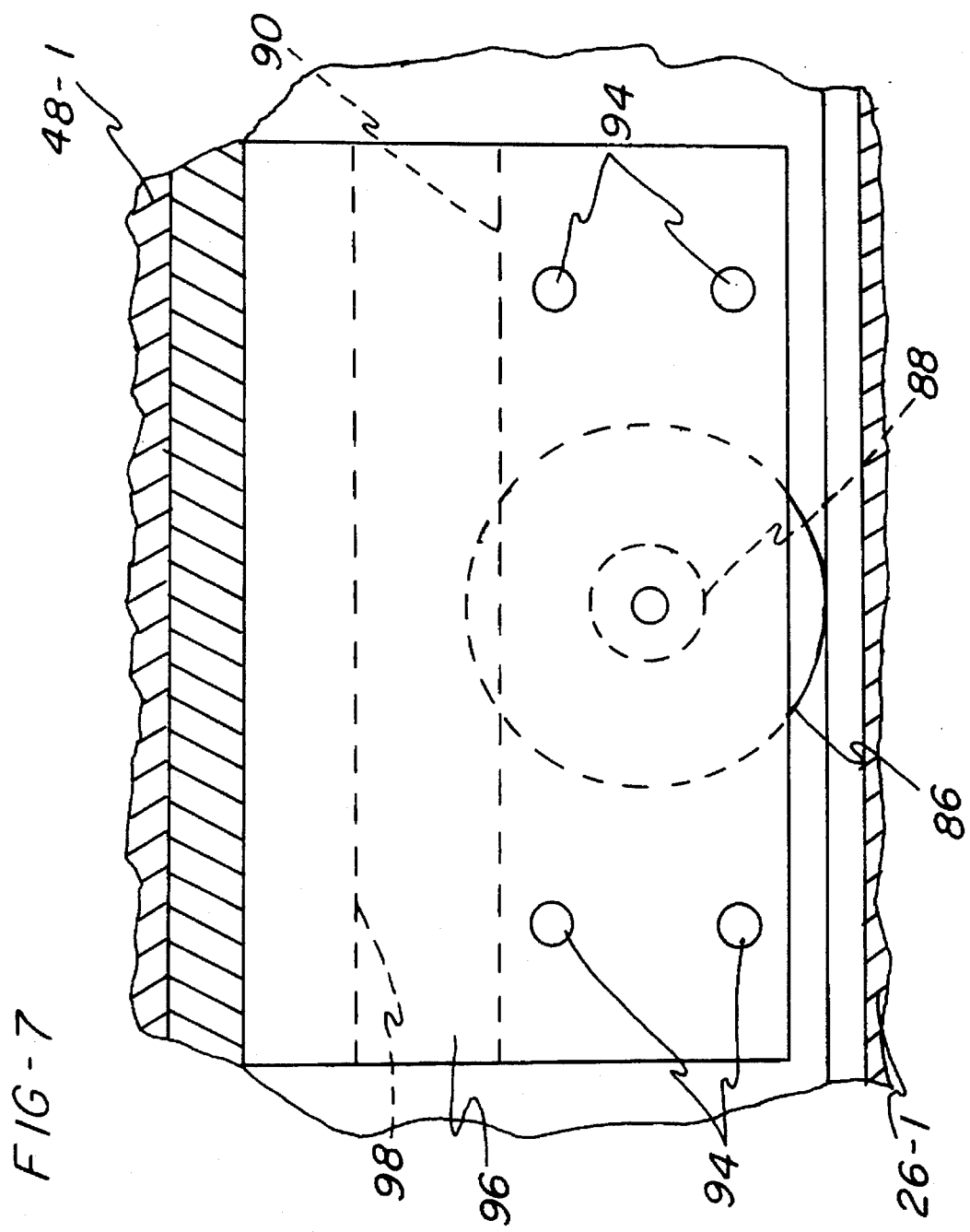

METHOD AND APPARATUS FOR POSITIONING AT LEAST ONE ENGRAVING HEAD

BACKGROUND OF THE INVENTION

1. Field of the Invention

This invention relates to a system for positioning engraving heads, and more particularly, to engravers having multiple engraving heads and a system for automatically axially positioning engraving heads into alignment in a predetermined configuration relative to a cylinder to be engraved.

2. Description of Related Art

The electromechanical engraving of a gravure cylinder involves rotating a cylinder while actuating an engraving head, or engraving heads, having a diamond stylus carried on an oscillating shaft. The stylus cuts or engraves cells or lines into the surface of the cylinder to produce an engraved cylinder for use in a printing process. The engraved cylinder is normally used in a web-type gravure printing press for printing paper, plastic, metallic film material, or other printed material.

In engravers for engraving cylinders used for printing publications, such as magazines or the like, the engraver includes multiple engraving heads wherein each engraving head includes a diamond stylus. By providing multiple heads, each head may be used to engrave different portions of the cylinder simultaneously wherein each portion of the cylinder engraved by a respective head may, by way of example, correspond to a different page of a publication.

The movement of the styli for performing the engraving operation is precisely controlled to ensure that the engraved cells or lines formed by each engraving head are located at the desired positions on the cylinder. However, the initial positioning of the engraving heads relative to each other has historically been very labor intensive wherein a skilled worker manually adjusted the position of each engraving head prior to an engraving operation.

For example, in a prior art engraver, a carriage carrying a plurality of engraving heads was positioned at a specific axial location, relative to an axis of a cylinder to be engraved, and one of the engraving heads was manually positioned in an axial direction into predetermined alignment with a fixed reference point. Then the carriage was moved or indexed a predetermined distance from the reference point and the next head was manually positioned into predetermined alignment with the reference point. This procedure was repeated until all of the engraving heads were positioned. The prior art method for positioning engraving heads has proven to be time consuming and it is difficult to obtain repeatable accuracy in positioning the heads. Further, movement of one of the heads, such as may be required to replace a diamond stylus, requires that the positioning of the other heads on the carriage be checked and/or adjusted to ensure that the relative positioning from head to head is maintained.

Accordingly, there exists a need for a system for locating multiple heads used in an engraving operation wherein the heads may be quickly and easily set up in a predetermined configuration at predetermined positions. Further, there is a need for such a system wherein a predetermined set-up for the heads may be accurately and repeatably obtained.

SUMMARY OF THE INVENTION

In one aspect, this invention comprises a system for locating engraving heads on a carriage comprising: engraving heads; and positioning means coupled to each of the engraving heads for selectively positioning the engraving heads into a predetermined configuration.

In another aspect, this invention comprises a system for positioning at least one engraving head into a predetermined position relative to a preselected engraving head, comprising: a driver for driving said at least one engraving head; and a controller coupled to said driver for energizing said driver in order to drive said at least one engraving head into said predetermined position.

In still another aspect, this invention comprises a method for positioning engraving heads in a predetermined configuration on an engraver for engraving cylinders, said method comprising the steps of: (a) determining said predetermined configuration; (b) energizing at least one driver to position at least one of said engraving heads until said engraving heads are configured in said preselected configuration; and (c) engraving said cylinder.

The system of the present invention may be embodied in various ways. In a first embodiment of the system, a carriage carrying engraving heads is provided which is movable along an engraver bed in an axial direction parallel to a cylinder to be engraved. The engraver bed includes a motor driven screw engaged with a nut affixed on the carriage for axially driving the carriage along the bed. In addition, the carriage is provided with a fixed screw or a plurality of screws and each of the engraving heads is provided with a motor driven nut engaged with the fixed screw. Each of the engraving heads may be positioned to a desired location on the carriage by actuating a drive nut motor to move a respective engraving head in an axial direction, and the carriage is driven for movement along the axis of the cylinder during an engraving operation by the motor driven screw mounted to the engraver bed.

In a second embodiment of the invention, engraving heads are located in an axial direction along an engraver bed and each engraving head includes a motor driven nut which is in engagement with a fixed screw mounted on the engraver bed. During an initial set-up of the engraver, the driven nut for each engraving head is actuated to position the engraving heads in a desired configuration wherein the engraving heads are spaced a desired distance from each other. With the relative starting position of the engraving heads thus established, the driven nuts are actuated at either the same or varying speeds to move the engraving heads along the axis of a cylinder during an engraving operation.

The driven nut mechanism for the above-described embodiments of the present invention embodies a further aspect of the invention. The driven nut mechanism is actuated by a controller which accurately controls the rotation of each driven nut to obtain linear movement for each engraving head in spite of any errors present in the pitch of the screw. The pitch of the screw is mapped to establish pitch errors for a series of nut rotation angles of the driven nut, and a table of corresponding incremental corrections is prepared and stored in the controller. Thereafter, the table is incorporated into the commands for actuating the driven nuts whereby the rotation of the nuts is adjusted to obtain accurate linear movement of the engraving heads.

In a third embodiment of the invention, engraving heads are supported on a carriage and the carriage is mounted for movement in an axial direction parallel to the axis of a cylinder to be engraved. The engraving heads are each mounted for axial movement relative to each other and relative to the carriage. The carriage is driven in axial movement along a bed for the engraver by a screw which threadably engages a nut or the carriage wherein rotation of the screw causes the carriage to move in the axial direction. Each of the engraving heads is provided with a pair of brakes wherein one of each pair of brakes is adapted to lock the engraving head to the bed of the engraver and the other brake is adapted to lock the engraving head to the carriage. Thus, each engraving head may be located on the carriage by locking a respective brake onto the engraver bed and rotating the screw to drive the carriage in movement relative to the bed. When the engraving head is located in its desired position, the other brake will be actuated to lock the engraving head to the carriage and the brake engaging the bed of the engraver is then released to permit the engraving head to move fixed to the carriage.

Therefore, it is an object of the present invention to provide a system for positioning engraving heads in a predetermined configuration in preparation for an engraving operation.

It is a further object of the invention to provide a system for positioning engraving heads including drive means for moving the engraving heads relative to each other.

It is yet another object of the invention to provide a system for automatically positioning engraving heads into a predetermined configuration whereby the necessity for operator input during the positioning of the engraving heads is minimized.

Other objects and advantages of the invention will be apparent in the following description, the accompanying drawings, and the appended claims.

BRIEF DESCRIPTION OF THE DRAWINGS

FIG. 7 is a view taken along line 7—7 in FIG. 6.

DETAILED DESCRIPTION OF THE PREFERRED EMBODIMENT

Figure 1:
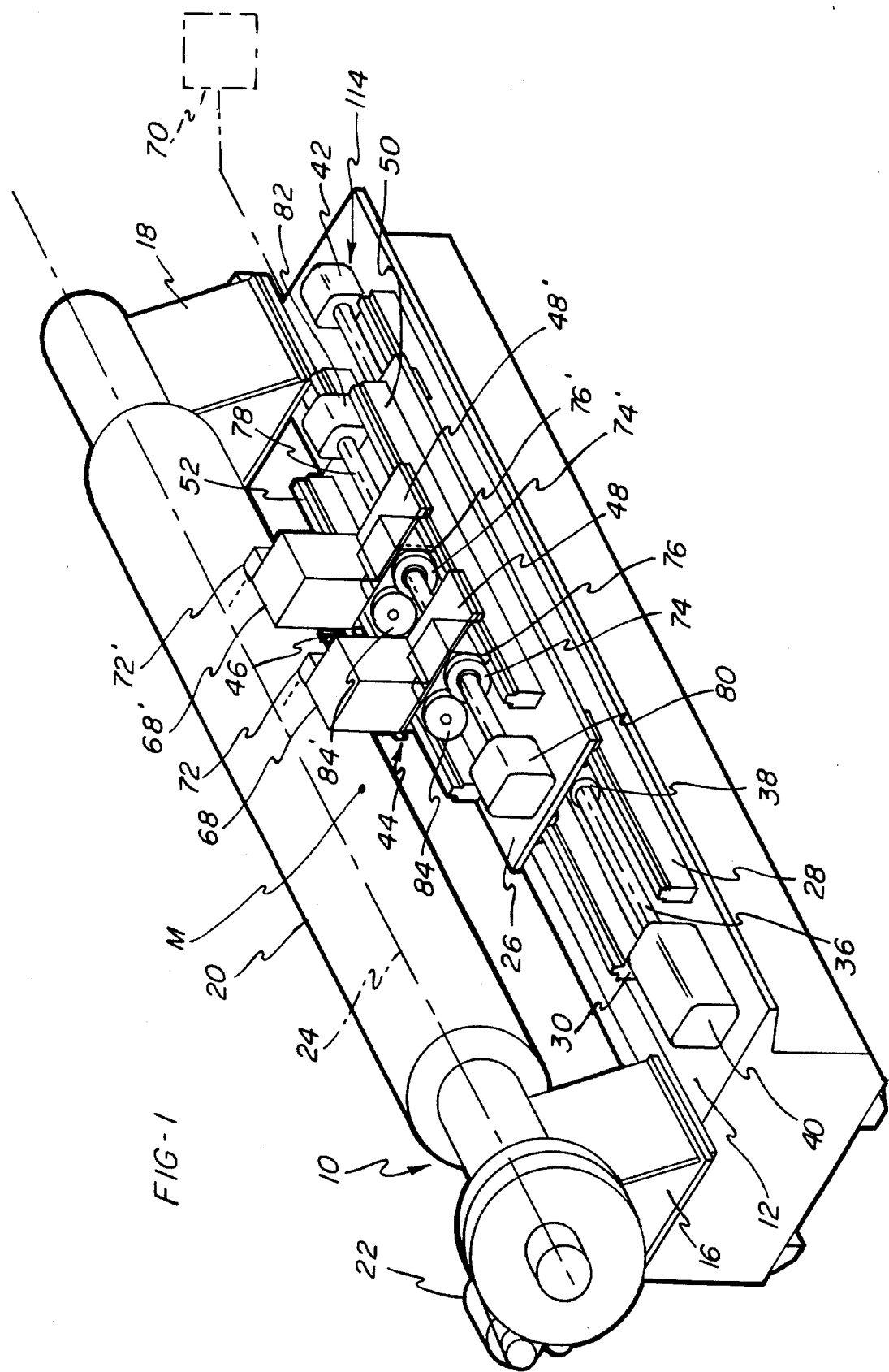
FIG. 1 is a perspective view of an engraver incorporating a preferred embodiment of the present invention.

Referring to FIG. 1, an engraver 10 is illustrated having an engraver bed 12 supporting an engraving head locating system 14. The engraver 10 includes a headstock 16 and tailstock 18 for supporting a cylinder 20 in the engraver 10 during an engraving operation. The headstock 16 is provided with a drive means including a motor 22 for driving the cylinder 20 in rotational movement about a longitudinal axis 24 of the cylinder 20.

Figure 2:
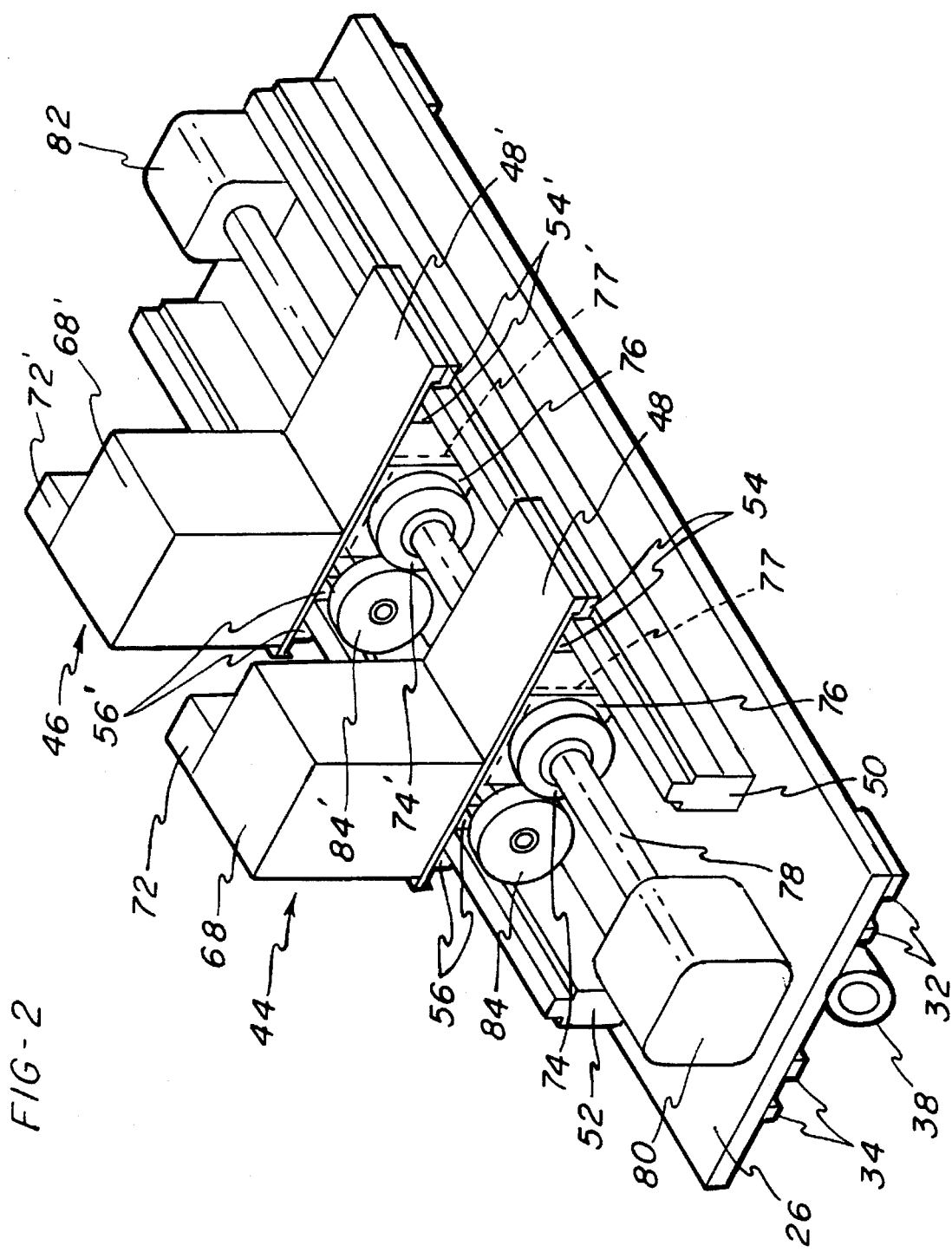
FIG. 2 is an enlarged perspective view of the base carriage and engraving head assemblies of FIG. 1.

As is illustrated in FIGS. 1 and 2, the engraving head locating system 14 includes a base carriage 26 which is slidably supported and guided for movement in an axial or lateral direction parallel to the longitudinal axis 24 along a track defined by a pair of guide rails 28 and 30. The lower portion of the base carriage 26 includes guides or guide shoes 32 and 34 for engaging opposing upper sides of the guide rails 28 and 30. The base carriage 26 is driven in its axial movement by translation means comprising a rotatable screw 36 threadably engaged with a nut 38 affixed to the lower side of the base carriage 26. The screw 36 is supported for rotation on the engraver bed 12 by bearings (not shown) and driven by a motor 40 located at one end of the screw 36, and further supported by a support 42 located at an opposite end thereof. The motor 40 may be a servo or stepper motor or comparable motor for rotating the screw 36 through precise angular movement whereby the base carriage 26 is accurately positioned relative to the axis 24 of the cylinder 20.

As is best seen in FIG. 2, a pair of engraving head assemblies 44 and 46 are mounted on the base carriage 26 wherein each engraving head assembly includes an engraving head 68, 68' and a head carriage 48, 48' for supporting the engraving head 68, 68'. The engraving heads 68, 68' may be similar to the engraving head disclosed in U.S. patent application Ser. No. 08/105,911, assigned to the assignee of the present application, and incorporated herein by reference. It should be noted that although two engraving head assemblies 44 and 46 are illustrated, the present invention is intended to encompass engraving head locating systems which incorporate any number of engraving head assemblies mounted to the base carriage 26. The head carriages 48, 48' of the engraving head assemblies 44 and 46 are supported on guide rails 50 and 52 for slidable movement in the axial or lateral direction parallel to the axis 24. The head carriages 48, 48' are guided and maintained in precise alignment relative to the guide rails 50 and 52 by guide shoes 54, 54' and 56, 56' extending from lower portions of the head carriages 48, 48' and engaging opposing upper sides of the guide rails 50 and 52.

Each engraving head assembly 44 and 46 is moved relative to the base carriage by translation means including a drive member or connector comprising a drive nut 74, 74' which is operatively connected to a driver 76, 76' including a motor 77, 77' for rotatably driving the nut 74, 74'. The translation means for moving the head assemblies 44, 46 further includes another drive or translation member comprising a screw 78 is supported on the base carriage 26 by support members 80 and to fix the screw 78 against axial and rotatable movement. The screw 78 passes through and threadably engages the drive nuts 74, 74' such that the drive nuts 74, 74' define connectors between the engraving head assemblies 44 and 46 and the screw 78. Thus, when operation of the drivers 76, 76' causes the drive nuts 74, 74' to rotate, the engraving head assemblies 44 and 46 will be actuated for movement in an axial direction along the base carriage 26. In addition, an encoder 84, 84' is preferably provided engaged with respective drive nuts 74, 74' for sensing the position of the engraving head assemblies 44 and 46 as a function of the rotation of the drive nuts 74, 74'. Thus, it should be apparent that the screw 68, drivers 76, 76' drive nuts 74, 74' and encoders 84, 84' comprise positioning or translation means for effecting movement of the engraving heads 68, 68' to predetermined axial locations. Alternatively, the drivers 76, 76' may comprise servo or stepper motors for accurately controlling rotation of the drive nuts 74, 74' to effect positioning of the engraving heads 68, 68'.

It should be noted that although the encoders 84, 84' are shown mounted to the head carriages 48, 48', the encoders may alternatively be mounted on the base carriage 26 and include means operatively connected to the head carriages 48, 48' to sense the position of the head carriage assemblies 44 and 46.

The engraver 10 further includes a computer or controller 70, such as a programmable controller, connected to the drivers 76, 76' and encoders 84, 84' for receiving inputs from the encoders 84, 84' for automatically controlling actuation of the drivers 76, 76' to effect the alignment of the engraving head assemblies 44 and 46 to desired locations on the base carriage 26. In addition, the controller 70 is connected to the motor 40 and engraving heads 68, 68' for controlling an engraving operation performed on the cylinder 20. During an alignment operation for positioning the engraving head assemblies 44 and 46, the controller 70 is initially programmed with a predetermined configuration for the heads 68, 68' and the respective drives 76, 76' are actuated independently of each other to rotate the drive nuts 74, 74' whereby the engraving head assemblies 44 and 46 are moved axially to desired locations on the base carriage 26.

Each engraving head 68, 68' may be provided with an optical cell sensor 72, 72' of the type described in U.S. patent application Ser. No. 08/038,679, assigned to the assignee of the present application, and incorporated herein by reference. The optical cell sensors 72, 72' are preferably used to detect the location of the engraving heads 68, 68' relative to engraved cells on the cylinder 20 for facilitating proper alignment of the heads 68, 68' along the axis 24 of the cylinder 20. Thus, the controller 70 may use the output of the sensors 72, 72' to facilitate accurately positioning the heads 68, 68' relative to each other, and relative to the cylinder 20.

With the engraving head assemblies 44 and 46 arranged in a desired configuration on the base carriage 26, an engraving operation may be performed by actuating the motor 40 to rotate the leadscrew 36 for locating the base carriage and associated engraving head assemblies to desired locations along the axial length of the cylinder 20. As the engraving head assemblies 44 and 46 are moved along the cylinder 20, the engraving heads 68, 68' will be actuated by the controller 70 such that diamond styli (not shown) carried by the engraving heads 68, 68' will be actuated to move toward and engrave cells or lines forming a plurality of patterns in the surface of the cylinder 20.

Figure 3:
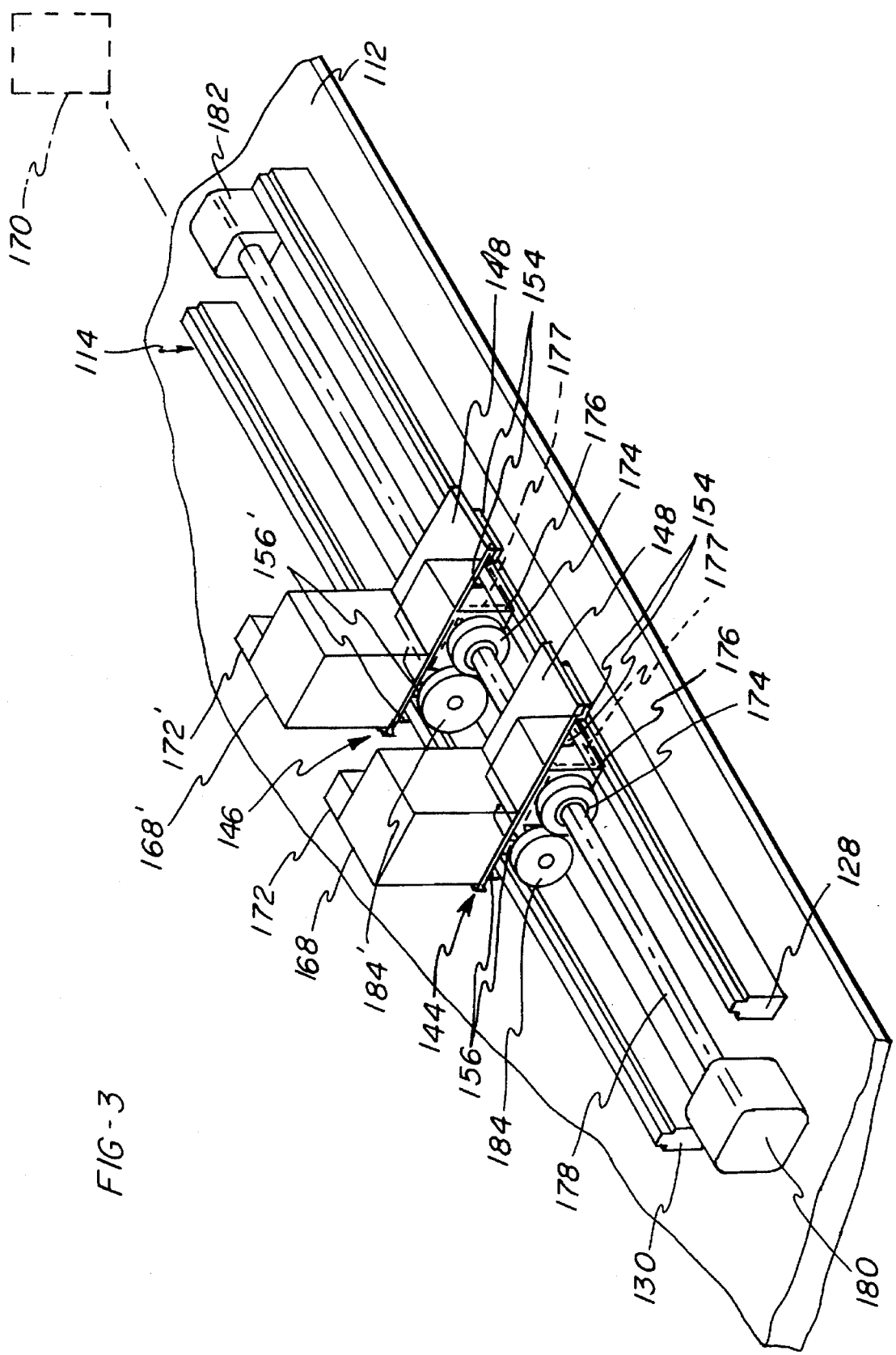
FIG. 3 is a perspective view of a second embodiment of the present invention.

Referring to FIG. 3, a second embodiment of the present invention is illustrated wherein elements similar to those described with reference to the previous embodiment are labeled with the same reference numeral increased by 100. The engraving head locating system 114 of FIG. 3 is similar to that of FIGS. 1 and 2 with the exception that the base carriage 26 of the previous embodiment has been eliminated. Specifically, the embodiment of FIG. 3 includes a pair of guide rails 128 and 130 mounted on an engraver bed 112 which define a track for supporting and guiding engraving head assemblies 144 and 146 in linear movement parallel to the axis of a cylinder to be engraved (not shown).

The engraving head assemblies 144 and 146 have substantially the same construction as the assemblies 44 and 46 described for the previous embodiment and include head carriages 148, 148' supporting engraving heads 68, 168'. A screw 178 is mounted to the engraver bed 112 by means of supports 180, 182 wherein the supports 180, 182 hold the screw 178 against rotation and axial movement. The screw 178 extends through and threadably engages drive nuts 174, 174' which are driven by drivers 176, 176' comprising drive motors 177, 177'. The screw 178, drive nuts 174, 174' and drivers 176, 176' form translation means for locating the head assemblies 144 and 146 at desired locations. In addition, encoders 184, 184' are provided for accurately monitoring the rotation of the drive nuts 176, 176', and optical sensors 172, 172' may be included on the engraving heads 168, 168' for accurately sensing the location of the engraving heads 168, 168' relative to a cylinder being engraved.

During an alignment operation, a controller 170 energizes the drivers 176, 176' to move the engraving head assemblies 144 and 146 into a desired configuration wherein the engraving heads 168, 168' are spaced a desired distance apart from each other and are positioned at predetermined locations along a cylinder. With the engraving head assemblies 144 and 146 thus positioned, an engraving operation may be initiated wherein the controller 170 energizes the drives 176, 176' to move the engraving head assemblies 144 and 146 in an axial direction in accordance with a predetermined program stored in the controller 170. Further, the engraving head assemblies 144 and 146 of the present embodiment may be actuated for movement at the same speed or at different speeds, depending on the requirements of the engraving operation. Also, the screw 178 could be driven by a motor (not shown) to simultaneously move the head assemblies 144 and 146 during an engraving operation.

With regard to the two above-described embodiments, it should be noted that the controllers 70 and 170 are preferably programmed to compensate for errors or variations in the pitch of the screws 36, 78 and 178, which errors could cause non-linear movement of the engraving head assemblies. Accordingly, the pitch of the screw 36, 78, 178 is preferably mapped, such as with an interferometer, and the data from the mapping is used to establish corresponding incremental corrections necessary to correct for pitch errors for a series of nut rotation angles of the drive nuts or for a series of rotations of the screw 36. The incremental corrections are stored in tabular form in the controller such that the controller may look up the necessary correction for any desired linear movement. The method of correcting for non-linearities in the screw 36, 78, 178 is similar to that described in U.S. patent application Ser. No. 08/023,060, assigned to the assignee of the present application, and incorporated herein by reference. Thus, the translation means for the present invention provides an accurate means for precisely positioning each of the engraving heads at a desired location and further does so while overcoming the inherent non-linearities in the screw pitch such that the present invention is adapted to substantially fully automate the axial positioning of the engraving heads relative to each other and relative to the cylinder.

Figure 4:
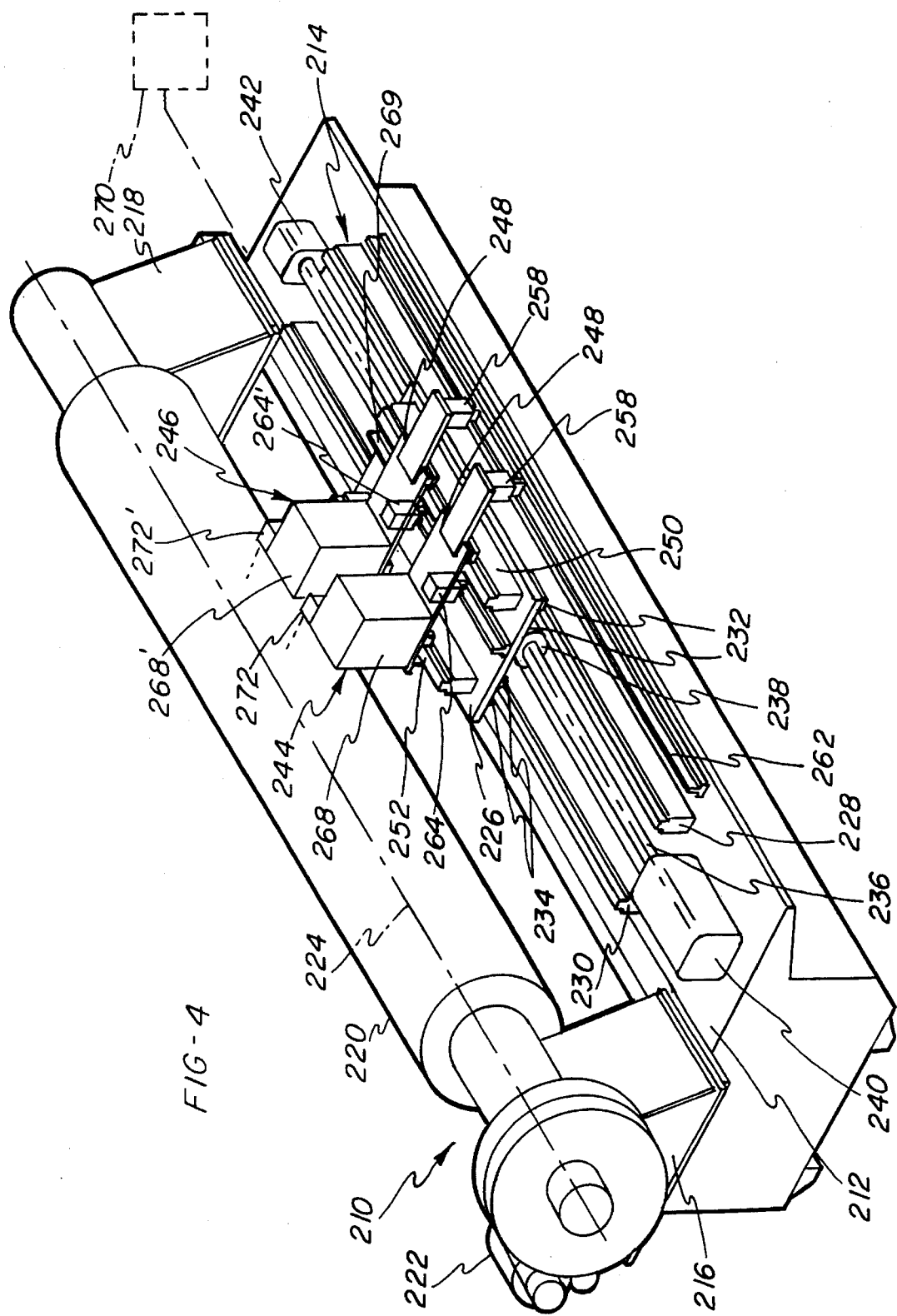
FIG. 4 is a perspective view of an engraver incorporating a third embodiment of the invention.
Figure 5:
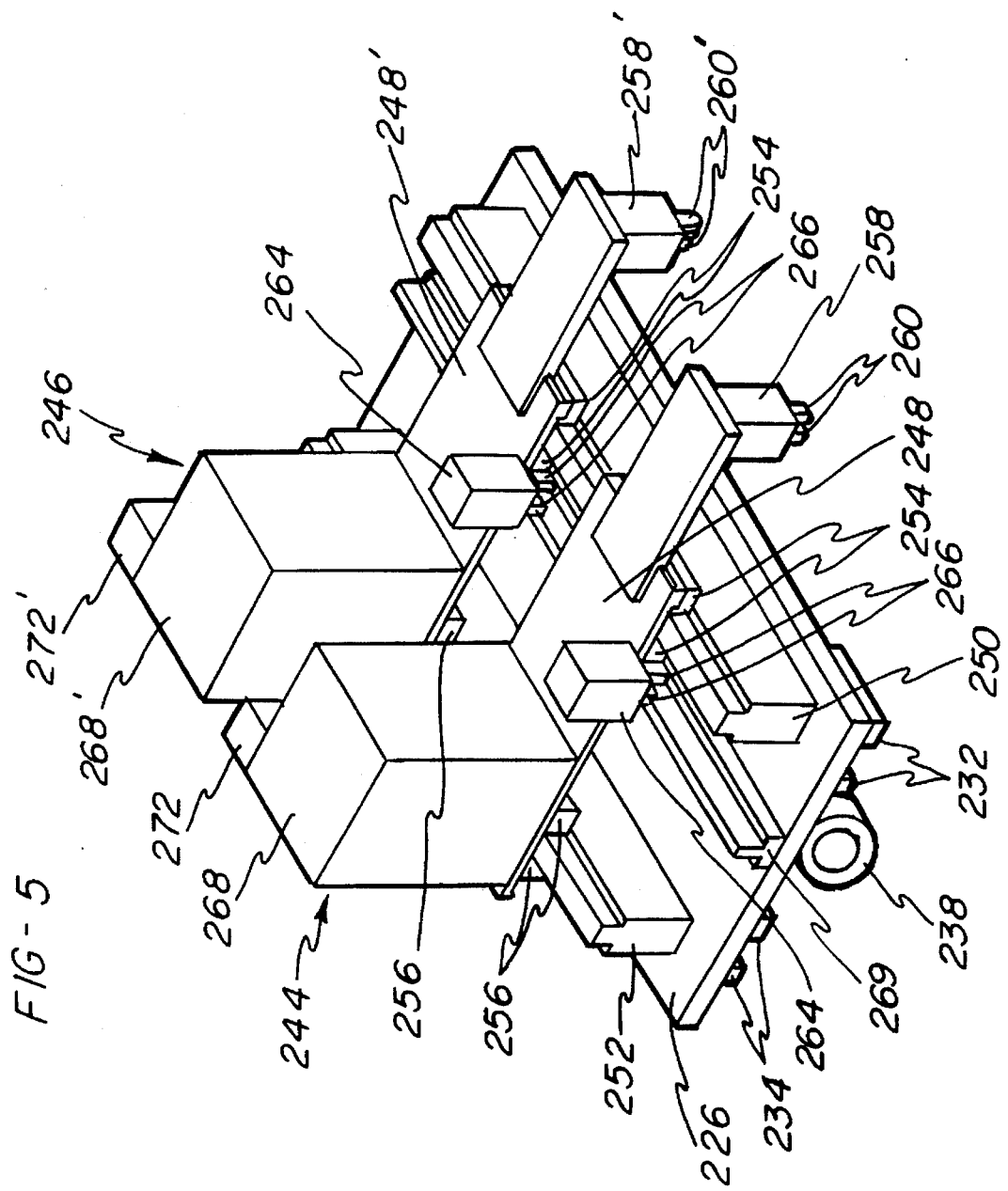
FIG. 5 is an enlarged perspective view of the base carriage and engraving head assemblies of FIG. 4.

Referring to FIGS. 4 and 5, a third embodiment of the invention is illustrated wherein elements corresponding to elements in the first embodiment are labeled with the same reference numeral increased by 200.

An engraving head locating system 214 is provided including a base carriage 226 which is supported and guided for movement in an axial direction parallel to the longitudinal axis 224 of a cylinder 220 by a pair of guide rails 228 and 230. The lower portion of the base carriage 226 includes guide shoes 232 and 234 for engaging opposing upper sides of the guide rails 228 and 230. The carriage 226 is driven in its axial movement by translation means including a rotatable screw 236 which is threadably engaged with a nut 238 affixed to the lower side of the base carriage 226. The screw 236 is supported on an engraver bed 212 by bearings (not shown) and driven by a motor 240 located at one end of the screw 236 and by a support 242 located at an opposite end thereof. The motor 240 is similar to the motor 40 of the first embodiment and rotates the screw 236 through precise angular movements whereby the base carriage 226 may be accurately positioned relative to the axis 224 of the cylinder 220. It should be noted that correction for non-linearities in the screw 236 may be made in the same manner as described above in relation to the screws 36, 78 and 178.

A pair of engraving head assemblies 244 and 246 are mounted on the base carriage 226, and each engraving head assembly 244 and 246 includes a head carriage 248, 248' supported on guide rails 250 and 252 for movement in an axial direction parallel to the axis 224. The head carriages 248, 248' are guided and maintained in precise alignment relative to the guide rails 250 and 252 by guide shoes 254 and 256 extending from lower portions of the head carriages 248, 248' and engaging opposing upper edges of the guide rails 250 and 252. Alignment brakes 258, 258' are mounted to lower portions of each of the head carriages 248, 248' and include brake shoes 260, 260' which engage an alignment rail 262, 262' mounted to the engraver bed 212. In addition, locking brakes 264, 264' are also mounted to the head carriages 248, 248' and include brake shoes 266, 266' which engage a locking rail 269 mounted to the base carriage 226. Each head carriage 248, 248' further supports a respective engraving head 268, 268' wherein the engraving heads 268, 268' each carry a diamond stylus (not shown) for engraving cells or lines on the cylinder 220. As in the previous embodiments, the engraving heads 268, 268' may be provided with optical cell sensors 272, 272' wherein the cell sensors 272, 272' are used to detect the location of the engraving heads 268, 268' relative to engraved cells on the cylinder 220 for facilitating proper alignment of the heads 268, 268' along the axis 224 of the cylinder 220.

The engraver 210 is operated under control of a programmable controller 270 which is adapted to monitor and control movements of the various components of the engraver 210. For example, the controller 270 is adapted to receive inputs from the sensors 272, 272' and to control actuation of the motor 240, the brakes 258, 258' and 264, 264' and the engraving heads 268, 268'.

In order to effect alignment of the engraving head assemblies 244 and 246 into a desired predetermined configuration, the configuration is first programmed into the controller 270 and the motor 240 and brakes 258, 258' and 264, 264' are actuated to achieve the desired positions for the engraving head assemblies 244 and 246. For example, the engraving head assemblies 244 and 246 may be positioned at predetermined locations on the base carriage 226 by first actuating the brake 258 such that the brake shoe 260 engages the locking rail 262, and releasing the brake 264 such that the engraving head assembly 244 is movable relative to the base carriage 226. The motor 240 is then actuated to rotate the screw 236 whereby the base carriage 226 is moved relative to the engraving head assembly 244 such that a desired relative position between the engraving head assembly 244 and carriage 248 is achieved. The locking brake 264 is then actuated such that the brake shoes 266 engage the locking rail 269 and the alignment brake 258 is released such that the engraving head assembly 244 is then locked in a desired position for movement with the base carriage 226. A similar operation is performed to align the engraving head assembly 246 relative to the base carriage 226, as well as relative to the other engraving head assembly 44. For example, with the engraving assembly 244 locked in its predetermined position on the base carriage 226, the alignment brake 258' is actuated to lock the engraving head assembly 246 against movement relative to the bed 212 and the locking brake 264' is released such that the base carriage 226 and the engraving head assembly 244 may be actuated for movement relative to the engraving head assembly 246. Upon achieving the desired configuration, i.e. a desired spacing between the engraving head assemblies 244 and 246, the locking brake 264' is actuated to lock the engraving head assembly in position on the head carriage 226 and the alignment brake 258' is released. During an engraving operation, the alignment brakes 258, 258' are maintained in a released position while the locking brakes 264, 264' maintain the engraving head assemblies 244 and 246 in a locked position on the base carriage 226.

To facilitate achieving the desired configuration, an engraved mark M (FIG. 1) may be used to locate the positioning of the engraving head assemblies relative to the cylinder 20. For example, the mark M could be used to locate the head carriage assembly 44 relative to the cylinders 10, and then the other heads adjusted into the predetermined configuration relative to the head carriage assembly 44.

Figure 6:
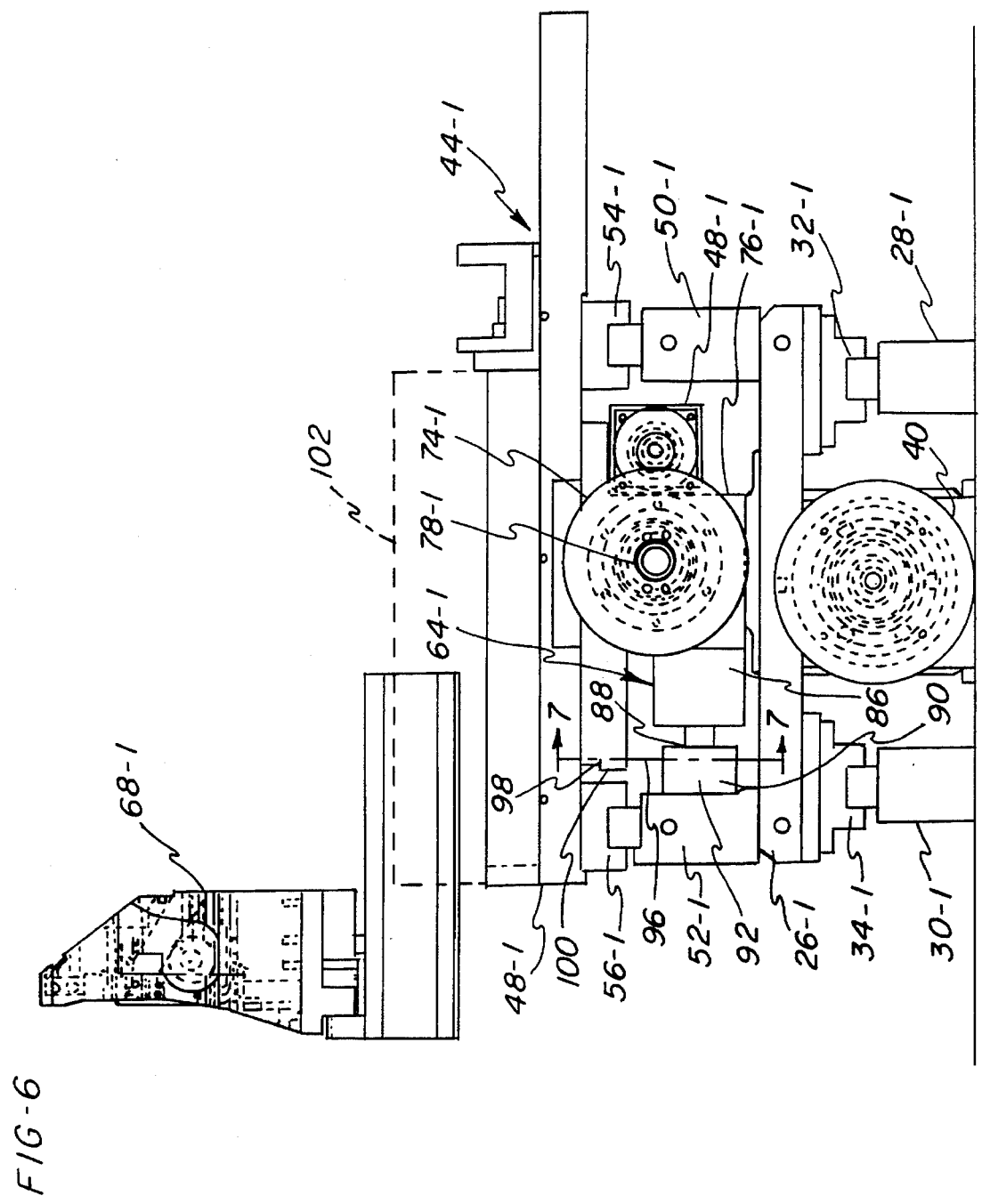
FIG. 6 is a side elevational view showing an alternative brake arrangement for the embodiment of FIGS. 1 and 2.

FIGS. 6 and 7 illustrate a further embodiment of the invention including an alternative braking system for the embodiment illustrated in FIGS. 1 and 2. In particular, the braking system is adapted to cause the head carriage 44-1 to be locked relative to the base carriage 26-1.

As in the embodiment of FIGS. 1 and 2, the base carriage 26-1 is supported for movement on guide rails 28-1 and 30-1 wherein guide members 32-1 and 34-1 are located in engagement with the rails 28-1 and 30-1. The base carriage 26-1 carries guide rails 50-1 and 52-1 for guiding engagement with guide members 54-1 and 56-1 associated with head carriage 48-1 of the head assembly 44-1.

The base carriage 26-1 is driven in movement along a screw (not shown) by a motor 40-1 wherein the screw (not shown) is engaged with a nut (not shown) rigidly attached to the base carriage 26-1. A driver 76-1 is carried by the head carriage 48-1 and drives a drive nut 74-1 located in threaded engagement with a screw 78-1 mounted to the base carriage 26-1. The rotational movement of the drive nut 74-1 is monitored by an encoder 84-1 which is also mounted to the head carriage 48-1.

When the head carriage 48-1 is located in a desired position relative to the base carriage 26-1, a brake 64-1 is actuated for engagement with a side of the guide rail 52-1 to thereby lock the head carriage 48-1 in its desired position. The brake 64-1 includes an actuator 86 mounted in association with the driver 76-1. The actuator may comprise a pneumatic, solenoid, hydraulic or other means for actuating an actuation rod or plunger 88 including a backing plate 90. A brake pad 92 is mounted to the backing plate 90 by means of fasteners such as screws 94 (FIG. 7). The brake pad 92 is preferably formed of steel or any other suitable brake material and is formed as an elongated member having a length substantially equal to the length of the backing plate 90, as shown in FIG. 7. A brake plate 96 is located sandwiched between the backing plate 90 and brake pad 92 and has a width substantially equal to the length of the brake pad 92. An upper end of the brake plate 96 is anchored to a lower edge 98 of the head carriage 48-1 and may be held in place by a bracket plate 100. The brake plate 96 is adapted to flex in response to movement of the brake pad 92 in a direction toward and away from the guide rail 52-1. Further, the brake plate 96 prevents movement of the assembly comprising the plunger 88, backing plate 90 and brake pad 92 in a direction perpendicular to the movement of the brake pad 92 toward or away from the rail 52-1. Thus, the actuator 86 is adapted to push the brake pad 92 into locking frictional engagement against the guide rail 52-1. Further, the brake plate 96 ensures that the head carriage 48-1 will be precisely located relative to the base carriage 26-1 by preventing sideways movement of the brake pad 92 relative to the head carriage 48-1 in a direction along the length of the rail 52-1.

Referring to FIG. 6, it should be noted that the engraving head 68-1 may be mounted to the head carriage 48-1 through a head locating mechanism, illustrated diagrammatically as element 102, which is adapted to precisely move the engraving head 68-1 toward or away from a cylinder to be engraved. The mechanism 102 for positioning the engraving head 68-1 toward and away from the cylinder may include means for accommodating different cylinder diameters while maintaining a desired orientation between the engraving head 68-1 and the cylinder. Such a mechanism is described in U.S. patent application Ser. No. 08/091,302, assigned to the assignee of the present application, and incorporated herein by reference.

It should be noted that the brake 64-1 could be incorporated into any of the embodiments of FIGS. 1–5. For example, engraving head assemblies 44 and 46 shown in FIGS. 1 and 2 may be provided with brakes 64-1 which may cooperate with a locking rail 69 mounted on the base carriage 26 to thereby lock the engraving head assemblies 44 and 46 at desired locations relative to the base carriage 26. Each brake 64-1 may be hydraulic, pneumatic or electric and individually actuated to cause the brake pad 92 to engage and brake against the locking rail 69. When the engraving head assemblies 44 and 46 are at their desired locations, the brakes 64, 64' are actuated by the controller 70 to lock the engraving head assemblies 44 and 46 in position.

Further, the head locating mechanism described in U.S. application Ser. No. 08/091,302 could be used for locating the engraving heads of any of the embodiments of FIGS. 1–5.

It also should be noted that leadscrew linearization, as described in the above-referenced U.S. patent application Ser. No. 08/023,060 now U.S. Pat. No. 5,329,215 may be used to correct for any non-linearities in the pitch of any the screws 36, 78, 178 and 236 or any other screws in the engraving system which may result in non-linear movement of either the base or the head carriages during rotation of the screws.

The present invention is not limited to the scope of the above-described embodiments and may include alternative means for accomplishing the same function described above. For example, the screw and nut sets may be leadscrew and nut sets, ball screw and nut sets, rack and pinion sets, belts and pulleys, linear motors, rod and cam arrangements, pneumatic or hydraulic cylinders or solenoid actuators, or other linear or rotary to linear motion devices. Further, the present head locating system may be adapted to arrange other types of heads, such as scanning heads or laser engraving heads, in a predetermined configuration.

Also, the drivers 76, 76', 176, 176' and drive motors 40 and 240, and any other drivers used in the present system, may comprise a servo motor or a stepper motor with a counter to precisely control the rotation of either screws or nuts or other drive structure associated with the drivers or motors.

From the above description, it should be apparent that the head locating system of the present invention is capable of arranging a plurality of engraving heads into a predetermined configuration wherein the configuration is determined by a program stored in a controller. Further, it should be apparent that the controller is capable of precisely positioning the heads relative to a cylinder to be engraved by using inputs from sensors for sensing the positions of cells, lines or other distinguishing features on a cylinder and for sensing the locations of the engraving heads within the engraver. Further, it should be noted that the present invention particularly facilitates setting up a plurality of engravers in that the program from a controller for one engraver may be utilized in the set-up of other engravers.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. An engraving system comprising:

at least one engraving head; and positioning means coupled to said at least one engraving head for moving said at least one engraving head in a direction which is generally parallel with the axis of the cylinder in order to automatically position said at least one engraving head into a predetermined initial pre-engraving position in the engraver.

2. The system as recited in claim 1 wherein said positioning means comprises a driver coupled to a controller; said controller being capable of energizing said driver to drive said at least one engraving head to the predetermined position.

3. The system as recited in claim 1 wherein the system comprises a plurality of engraving heads; said positioning means including at least one driver associated with at least one of said plurality of engraving heads.

4. The system as recited in claim 2 wherein the driver is a stepper motor.

5. The system as recited in claim 2 wherein said positioning means comprises a sensor for sensing the position of said at least one engraving head.

6. The system as recited in claim 1 wherein said at least one engraving head is located on a carriage which is slidably mounted on the engraver.

7. The system as recited in claim 6 wherein said driver comprises a sensor for sensing the relative position of said at least one engraving head on the carriage.

8. The system as recited in claim 1 wherein said engraver comprises a screw, said positioning means comprising a driver associated with at least one of said at least one engraving head and cooperating with said screw to position said at least one engraving head into the predetermined position.

9. The system as recited in claim 1 wherein said system further comprises a brake for braking at least one of said at least one engraving head into the predetermined position.

10. The system as recited in claim 1 wherein said at least one engraving head comprises a preselected engraving head and a second engraving head, translation means comprises drive means for permitting said preselected engraving head and said second engraving head to be driven while maintaining a predetermined spacing between said second engraving head and said preselected engraving head.

11. The system as recited in claim 1 wherein said system further comprises means for driving said at least one engraving head towards and away from an axial line of a cylinder when the cylinder is mounted in the engraver.

12. The system as recited in claim 5 wherein said sensor comprises an encoder associated with said driver.

13. The system as recited in claim 1 wherein said engraver comprises a sensor for sensing the position of said engraving head relative to said cylinder.

14. The system as recited in claim 12 wherein said sensor is an optical sensor.

15. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein the system comprises a plurality of engraving heads; said positioning means including at least one driver associated with at least one of said plurality of engraving heads and wherein said positioning means further comprises at least one sensor associated with at least one driver for sensing the relative positions of said plurality of engraving heads.

16. The system as recited in claim 15 wherein said driver is a stepper motor.

17. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein said at least one engraving head is located on a carriage which is slidably mounted on the engraver;

wherein said positioning means is located on said carriage.

18. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein said at least one engraving head is located on a carriage which is slidably mounted on the engraver;

wherein said system comprises a plurality of engraving heads located on the carriage;

said positioning means being capable of driving said plurality of engraving heads into a predetermined position on the carriage.

19. The system as recited in claim 18 wherein said positioning means comprises a driver.

20. The system as recited in claim 19 wherein said driver comprises a stepper motor.

21. The system as recited in claim 20 wherein said driver comprises a sensor for sensing the relative position of said plurality of engraving heads, said sensor comprising an encoder.

22. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein said engraver comprises a screw, said positioning means comprising a driver associated with at least one of said at least one engraving head and cooperating with said screw to position said at least one engraving head into the predetermined position; and wherein said at least one engraving head, said screw and said positioning means are mounted on a carriage.

23. The system as recited in claim 22 wherein said driver comprises a connector rotatably mounted on said screw and a drive motor associated with said at least one engraving head for causing relative movement between said connector and said screw to cause said at least one engraving head to be moved into said predetermined position.

24. The system as recited in claim 23 wherein said connector is a rotatable nut.

25. The system as recited in claim 23 wherein said driver rotatably drives the screw.

26. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein said engraver comprises a screw, said positioning means comprising a driver associated with at least one of said at least one engraving head and cooperating with said screw to position said at least one engraving head into the predetermined position; and wherein said driver comprises a connector rotatably mounted on said screw and a drive motor associated with said at least one engraving head for causing relative movement between said connector and said screw to cause said at least one engraving head to be moved into said predetermined position.

27. The system as recited in claim 26 wherein said connector is a rotatable nut.

28. The system as recited in claim 27 wherein the screw is located on a bed of the engraver.

29. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein said at least one engraving head comprises a preselected engraving head and a second engraving head, translation means comprises drive means for permitting said preselected engraving head and said second engraving head to be driven while maintaining a predetermined spacing between said second engraving head and said preselected engraving head; and wherein said drive means drives said preselected engraving head and said second engraving head in a direction which is generally parallel to an axis of a cylinder when the cylinder is placed in the engraver.

30. An engraving system comprising:

at least one engraving head; and positioning means coupled to said at least one engraving head for moving said at least one engraving head in a direction which is generally parallel with the axis of the cylinder in order to position said at least one engraving head into a predetermined position in the engraver;

wherein said at least one engraving head comprises a preselected engraving head and a second engraving head, translation means comprises drive means for permitting said preselected engraving head and said second engraving head to be driven while maintaining a predetermined spacing between said second engraving head and said preselected engraving head; and wherein said drive means comprises a screw mounted on the engraver, at least one connector associated with said preselected engraving head and said second engraving head and mounted on said screw and a drive motor for causing relative movement between the at least one connector and the screw to drive said preselected engraving head and said second engraving head.

31. The system as recited in claim 30 wherein said drive motor being operably coupled to said screw in order to rotatably drive the screw.

32. The system as recited in claim 30 wherein at least one connector is a nut, said drive motor being operatively coupled to said nut in order to rotatably drive the nut.

33. A method for engraving a cylinder comprising the steps of:

(a) mounting a cylinder on the engraver;

(b) automatically adjusting a plurality of engraving heads into a predetermined configuration in an initial pre-engraved position in order to engrave a plurality of images onto said cylinder; and (c) engraving said plurality of images onto said cylinder.

34. The method as recited in claim 33 wherein said method further comprises the steps of:

programming said plurality of images into a computer in said engraver;

using said computer to perform said adjusting step.

35. The method as recited in claim 34 wherein said method further comprises the step of:

energizing at least one translation means for adjusting said plurality of engraving heads into said predetermined configuration.

36. The method as recited in claim 35 wherein said translation means comprises a driver associated with at least one of said plurality of engraving head, said method further comprising the step of:

energizing said driver so that said engraving heads are positioned into said predetermined configuration on said carriage.

37. The method as recited in claim 33 wherein said method comprises the step of:

using a drive system to drive said plurality of engraving heads into said predetermined configuration.

38. The method as recited in claim 33 wherein said method further comprises the step of:

sensing a relative position between at least one of said plurality of engraving heads and a predetermined location on said cylinder.

39. A method for engraving a cylinder comprising the steps of:

(a) mounting a cylinder on the engraver;

(b) automatically adjusting a plurality of engraving heads into a predetermined configuration in order to engrave a plurality of images onto said cylinder; and (c) engraving said plurality of images onto said cylinder;

wherein said method further comprises the step of:

adjustably locating said plurality of engraving heads on a carriage which is adjustably mounted on said engraver.

40. The method as recited in claim 39 wherein said engraving step further comprises the step of:

driving said carriage in a direction which is generally parallel to the axis of said cylinder when the engraver engraves said cylinder.

41. The method as recited in claim 39 wherein said method further comprises the step of:

driving said carriage in order to adjustably locate said plurality of engraving heads thereon.

42. The method as recited in claim 39 wherein each of said engraving heads comprises a connector associated therewith, said connector being adjustably mounted on a mating member associated with the carriage, said method further comprising the step of:

causing relative movement between said connector and said mating member in order to cause said engraving head to move to a predetermined position.

43. The method as recited in claim 42 wherein said connector is a rotatable nut and said mating member is a screw.

44. A method for engraving a cylinder comprising the steps of:

(a) mounting a cylinder on the engraver;

(b) automatically adjusting a plurality of engraving heads into a predetermined configuration in order to engrave a plurality of images onto said cylinder; and (c) engraving said plurality of images onto said cylinder; and wherein said method further comprises the step of:

locking said plurality of engraving heads into said predetermined configuration.

45. A method for engraving a cylinder comprising the steps of:

(a) mounting a cylinder on the engraver;

(b) automatically adjusting a plurality of engraving heads into a predetermined configuration in order to engrave a plurality of images onto said cylinder; and (c) engraving said plurality of images onto said cylinder;

wherein said method further comprises the step of:

sensing a relative position between at least one of said plurality of engraving heads and a predetermined location on said cylinder;

said predetermined location being defined by an engraved mark engraved on said cylinder.

46. The method as recited in claim 45 wherein said sensing step is effected using an optical sensor.

47. An engraving system comprising:

a plurality of engraving heads;

a positioner for moving said plurality of engraving heads in order to automatically position said plurality of engraving heads into a predetermined engraving position in an engraver; and a brake associated with said positioner for locking said plurality of engraving heads into said predetermined position.

48. The engraving system as recited in claim 47 wherein said positioner comprises a driver coupled to a controller;

said controller being capable of energizing said driver to drive said plurality of engraving heads to said predetermined position.

49. The engraving system as recited in claim 48 wherein said driver is a stepper motor.

50. The engraving system as recited in claim 47 wherein said positioner comprises a sensor for sensing the position of said plurality of engraving heads.

51. The engraving system as recited in claim 48 wherein said positioner further comprises at least one sensor associated with said driver for sensing the relative position of said plurality of engraving heads.

52. The engraving system as recited in claim 47 wherein at least one of said plurality of engraving heads is located on a carriage which is slidably mounted onto the engraver.

53. The engraving system as recited in claim 47 wherein said positioner is located on a carriage.

54. The engraving system as recited in claim 47 wherein said plurality of engraving heads are adjustably located on a carriage.

55. The engraving system as recited in claim 54 wherein said positioner comprises a driver being capable of driving said plurality of engraving heads into said predetermined position on said carriage.

56. The engraving system as recited in claim 47 wherein said positioner comprises a driver.

57. The engraving system as recited in claim 56 wherein said driver comprises a stepper motor.

58. The engraving system as recited in claim 56 wherein said driver comprises a sensor for sensing the relative position of at least one of said plurality of engraving heads.

59. The engraving system as recited in claim 56 wherein said driver comprises a sensor for sensing the relative position of said plurality of engraving heads, and wherein said sensor comprises an encoder.

60. The engraving system as recited in claim 47 wherein said engraver comprises a screw, said positioner comprising a driver associated with said plurality of engraving heads and cooperating with said screw to position said plurality of engraving heads into said predetermined position.

61. The engraving system as recited in claim 60 wherein said plurality of engraving heads, said screw and said positioner are situated on a carriage.

62. The engraving system as recited in claim 56 wherein said driver comprises a connector rotatably mounted on said screw and a drive motor associated with said plurality of engraving heads for causing relative movement between said connector and said screw to cause at least one of said plurality of engraving heads to move into said predetermined position.

63. The engraving system as recited in claim 56 wherein said driver comprises a connector rotatably mounted on said screw and a drive motor associated with said plurality of engraving heads for causing relative movement between said connector and said screw to cause said plurality of engraving heads to be moved into said predetermined position.

64. The system as recited in claim 62 wherein said connector is a rotatable nut.

65. The engraving system as recited in claim 62 wherein said driver rotatably drives the screw.

66. The engraving system as recited in claim 60 wherein the screw is located on a bed of the engraver.

67. The engraving system as recited in claim 47 wherein said brake comprises an actuator.

68. The engraving system as recited in claim 47 wherein said brake is actuated for engagement with a rail situated on the engraver.

69. The engraving system as recited in claim 47 wherein said brake is actuated for engagement with a rail situated on a carriage.

70. The engraving system as recited in claim 47 wherein said brake comprises a brake pad.

71. The engraving system as recited in claim 69 wherein said brake comprises a brake pad.

72. The engraving system as recited in claim 70 wherein said brake pad is formed of steel.

73. The engraving system as recited in claim 67 wherein said actuator comprises a pneumatic solenoid.

74. The engraving system as recited in claim 67 wherein said actuator is a solenoid.

75. The engraving system as recited in claim 67 wherein said solenoid is hydraulic.

76. The engraving system as recited in claim 47 wherein said engraver comprises a sensor for sensing the position of the engraving head relative to the cylinder.

77. The engraving system as recited in claim 76 wherein said sensor comprises an optical sensor.

78. A method for situating a plurality of engraving heads into a pre-engraving position, said method comprising the steps of:

automatically adjusting said plurality of engraving heads into said pre-engraving position; and locking said plurality of engraving heads into said pre-engraving position.

79. The method as recited in claim 78 wherein said method further comprises the steps of:

programming said pre-engraving position into a computer in said engraver;

using said computer during said adjusting step.

80. The method as recited in claim 78 wherein said method further comprises the step of:

energizing at least one translator for adjusting said plurality of engraving heads into said predetermined configuration.

81. The method as recited in claim 78 wherein said method further comprises the step of:

adjustably locating said plurality of engraving heads on a carriage which is adjustably mounted on the engraver.

82. The method as recited in claim 80 wherein said at least one translator comprises a driver associated with said plurality of engraving heads, said method further comprising the step of:

energizing said driver so that said plurality of engraving heads are positioned into said pre-engraving position.

83. The method as recited in claim 78 wherein said method further comprises the step of:

situating said plurality of engraving heads on a carriage situated on the engraver.

84. The method as recited in claim 78 wherein said method further comprises the step of:

engraving at least one image onto the cylinder situated on the engraver.

85. The method as recited in claim 84 wherein said engraving step comprises the steps of:

situating said plurality of engraving heads on a carriage;

driving a carriage in a direction which is generally parallel to the axis of the cylinder when the engraving engraves said cylinder.

86. The method as recited in claim 83 wherein said method further comprises the step of:

driving said carriage in order to adjustably locate said plurality of engraving heads.

87. The method as recited in claim 78 wherein said locking step further comprises the step of:

actuating a brake pad.

88. The method as recited in claim 87 wherein said method further comprises the step of:

energizing a solenoid to actuate said brake.

89. The method as recited in claim 78 wherein said method comprises the step of:

using a drive system to drive said plurality of engraving heads into said pre-engraving position.

90. The method as recited in claim 83 wherein each of said plurality of engraving heads comprises a connector associated therewith, said connector being adjustably mounted on a mating member associated with the carriage, said method further comprising the step of:

causing relative movement between said connector and said mating member in order to cause at least one of said plurality of engraving heads to move.

91. The method as recited in claim 90 wherein said connector is a rotatable nut and said mating member is a screw.

92. The method as recited in claim 78 wherein said method further comprises the step of:

sensing a relative position between at least one of said plurality of engraving heads and a predetermined location on said cylinder.

93. The method as recited in claim 92 wherein said predetermined location is defined by an engraved mark engraved on said cylinder.

94. The method as recited in claim 92 wherein said sensing step is affected using an optical sensor.

* * * * *